Feb. 3, 1959 R. P. DUFOUR 2,872,662

ELECTRONIC STORAGE DEVICE

Filed April 29, 1954 8 Sheets-Sheet 1

INVENTOR.
ROLAND PAUL DUFOUR

BY Albert R. Hodges

ATTORNEY

INVENTOR.
ROLAND PAUL DUFOUR
BY
Albert R. Hodges
ATTORNEY

INVENTOR.
ROLAND PAUL DUFOUR
BY
Albert R. Hodges
ATTORNEY

INVENTOR.
ROLAND PAUL DUFOUR
BY
Albert R. Hodges
ATTORNEY

INVENTOR
ROLAND PAUL DUFOUR
BY Albert R. Hodges
ATTORNEY

INVENTOR
ROLAND PAUL DUFOUR
BY Albert R. Hodges
ATTORNEY

Feb. 3, 1959 R. P. DUFOUR 2,872,662

ELECTRONIC STORAGE DEVICE

Filed April 29, 1954 8 Sheets-Sheet 7

INVENTOR
ROLAND PAUL DUFOUR
BY Albert R. Hodges
ATTORNEY

Feb. 3, 1959 R. P. DUFOUR 2,872,662

ELECTRONIC STORAGE DEVICE

Filed April 29, 1954 8 Sheets-Sheet 8

INVENTOR
ROLAND PAUL DUFOUR
BY Albert R. Hodges
ATTORNEY

United States Patent Office 2,872,662

Patented Feb. 3, 1959

2,872,662

ELECTRONIC STORAGE DEVICE

Roland Paul Dufour, Paris, France, assignor to International Business Machines Corporation, New York, N. Y., a corporation of New York Application April 29, 1954, Serial No. 426,457

Claims priority, application France November 24, 1953

7 Claims. (Cl. 340—173)

The present invention relates to an electronic storage device and more particularly to a regenerative dynamic storage device adapted to provide, in each succeeding cycle, a pulse having a time position corresponding with that of a pulse stored, or recorded, in the initial operating cycle.

The principal object of the present invention is the provision of a new, more stable and less complex electronic storage device, adapted to yield at a predetermined instant of each operating cycle a pulse corresponding to a stored, or recorded, value.

Another object of the present invention is the provision of a new electronic storage device utilizing a periodically charged and discharged capacitor.

A further object of the present invention is the provision of control circuits in conjunction with an electronic storage device for the purpose of enhancing the stability of the device even under conditions of undesired variations in the supply voltage.

Other objects of the invention will be pointed out in the following description and claims and illustrated in the accompanying drawings, which disclose by way of example the principle of the invention and the best mode, which has been contemplated, of applying that principle.

In the drawings:

Fig. 1 is a schematic circuit diagram, partially in block form, of a three-position storage unit in accordance with the present invention;

Figs. 2 and 3 comprise circuit diagrams of the biasing arrangements associated with the storage devices of Fig. 1;

Figure 1:
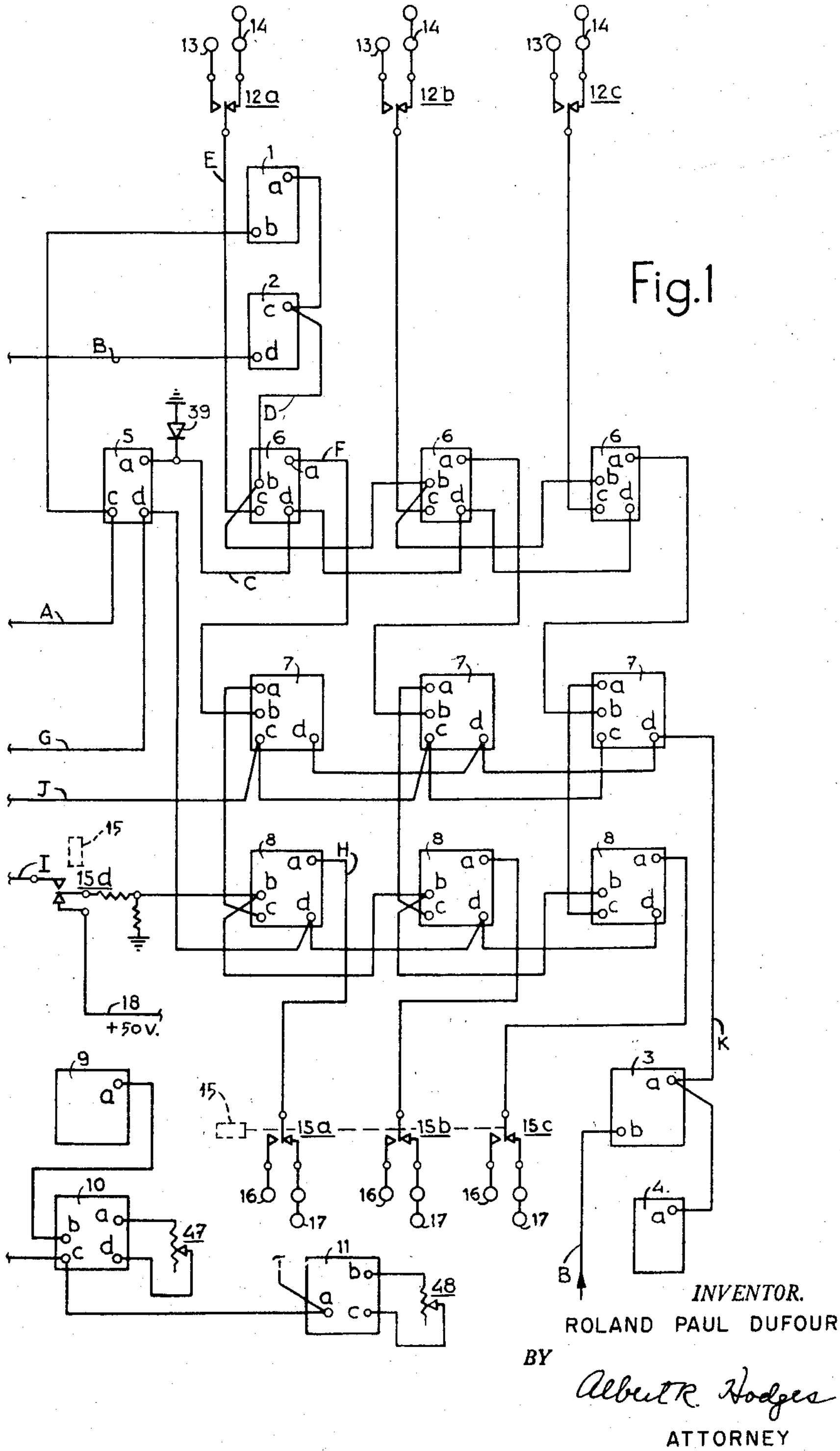
Figure 10:
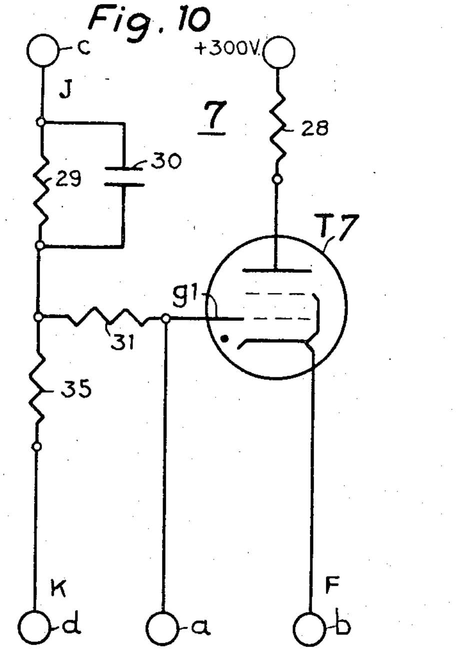
Figure 9:
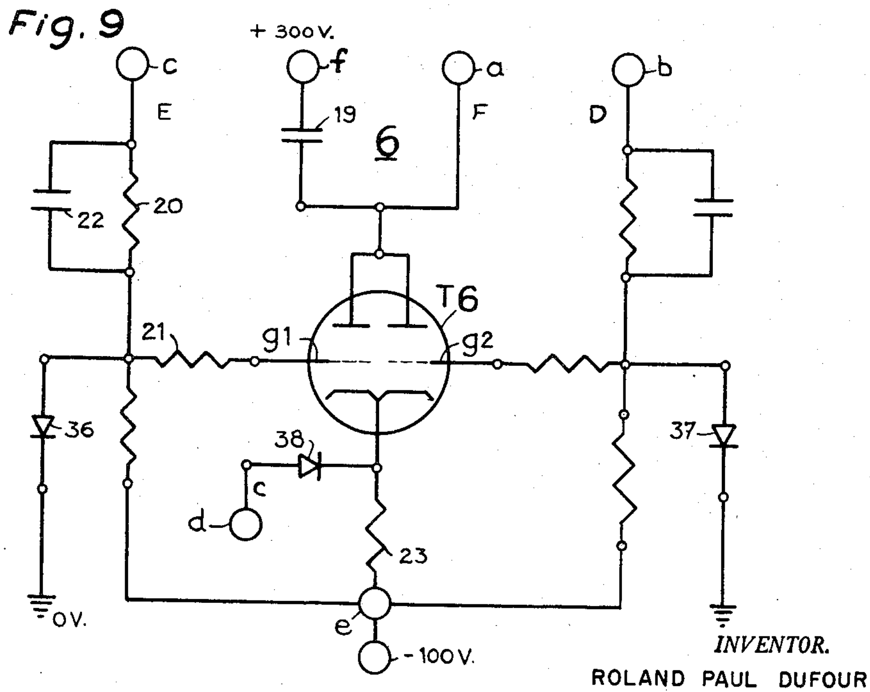

Figs. 9 and 10 comprise the circuit diagram of an electronic storage device in accordance with the present invention; and Figs. 11–14 are graphical representations of the approximate waveforms which exist in various portions of the system of Fig. 1, respectively during the operations of recording, regeneration, reading and resetting.

Before the circuits comprising the storage unit, in accordance with the disclosed embodiment of the present invention, are described, the general principle of operation will be briefly discussed.

A capacitor, one electrode of which is maintained at a constant potential $V_m$, is charged beginning at a predetermined time corresponding to the value to be recorded. For this purpose, each operating cycle is divided into a number of equal intervals defining a certain number of points. In the case of storing, or recording, in a decimal system, the values 9 through 0 are assigned ten consecutive points of the operating cycle. If it is desired to record, or store, the value 6, for example, the capacitor comprising the storage element is charged beginning at point 6. According to the invention, charge is proportional to time, so that after six points the potential of the second electrode of the capacitor decreases until it reaches a value equal to $V_m-0.6(V_m-V_0)$, where $V_0$ designates the potential reached by the second electrode after a charge having a duration of ten points. When the capacitor reaches a charge equal to $$Cx[V_m-0.6(V_m-V_0)]$$

that is, at point 0 of the operating cycle, a blocking circuit stops the charge until the end of the cycle, thus allowing a certain interval of time for performing various operations, as for example zero resetting.

If it is assumed that the first point of the next operating cycle has the value 9 assigned to it, a starting circuit causes the capacitor to start charging again at the beginning of this second operating cycle, so that the potential of the second electrode decreases until the value $V_0$ is reached at point 6. This voltage is applied to the cathode of a thyratron, causing its ionization and leading to the sudden discharge of the capacitor. The voltage changes corresponding to the charge and discharge of the capacitor are shown by curve F in Fig. 11.

The storing of the value thus recorded is performed in a similar manner, as soon as the sudden discharge of the capacitor has returned its second electrode to the potential value $V_m$. Beginning at point 6 of the second operating cycle, the capacitor is again charged so that its second electrode reaches the potential $$V_m-0.6(V_m-V_0)$$

at point 0 of the second operating cycle. The operations described above are repeated, so that the discharge of the capacitor always occurs at point 6 corresponding to the value to be stored or recorded.

It will be apparent that it would be possible to operate in a similar manner by causing a linear discharge and a sudden recharge of the capacitor. Also, it would be possible, still without departing from the scope of the invention, to start charging the capacitor at the beginning of the recording cycle and to stop the charging after six points. Under these conditions, regeneration operations would be similar to those which have been just described, since the capacitor would still be charged to the value $V_m-0.6(V_m-V_0)$ at the beginning of the next cycle. Furthermore, it would be possible to start any recording cycle with a charging of the capacitor until the point corresponding to the value to be recorded is reached, and then to suddenly discharge the capacitor by the firing of the above-mentioned thyratron. These variations in the mode of operation may be made without departing from the scope of the invention, the choice of the particular mode to be used depending mainly upon the form of the pulses which control the recording.

In order to facilitate the understanding of the present explanation, recording, regeneration, reading and zero resetting circuits of a device in accordance with the present invention will be described. It being assumed that the recording and storing of a value equal to 6 during a given number of cycles is desired.

Referring now to Fig. 1 of the drawings, there is shown a storage unit with only three recording positions, in order to simplify the drawing. It will be understood, of course, that the present invention is equally useful in storage units comprising a greater or lesser number of recording positions. It is pointed out that elements 1, 2, 3, 4 and 5 are common to all of the storage positions. Each storage position comprises three elements designated 6, 7 and 8. Elements 9, 10 and 11 are common not only to all of the positions of a storage unit but also to all similar storage units employed in a given computer.

Transfer contacts 12*a*, 12*b* and 12*c* are provided respectively for the three storage positions. These contacts serve to connect the recording circuits of the storage unit either to terminals 13, to which may be applied pulses coming from a direct recording, or to terminals 14 which may, for example, be intended for the reception of pulses coming from the reading of the values recorded in a counter. Since these input arrangements do not comprise a portion of the present invention, the relay for controlling the transfer of contacts 12*a*, 12*b* and 12*c* has not been shown.

A similar arrangement has been provided for handling the output pulses corresponding to the reading of the values stored, or recorded, in the storage unit. For this purpose, a relay 15 controls the three transfer contacts 15*a*, 15*b* and 15*c*, associated respectively with the three recording positions and with the terminals 16 and 17. Terminals 16 are intended for providing output pulses whenever the performance of a simple transfer is desired. Terminals 17 are intended for collecting output pulses (curve H, Figs. 11–14) during each operating cycle. A contact 15*d* is provided, controlled by the same relay 15 which controls contacts 15*a*, 15*b* and 15*c*, and adapted for the control of elements 8. When relay 15 is not picked up, contact 15*d* connects terminals *b* of elements 8 to line 18, which is maintained at a constant potential of approximately +50 volts. On the other hand, when relay 15 picks up, terminals *b* of elements 8 are connected through contact 15*d* to line I which is subject to the potential variation shown by curve I in Fig. 13. In this case, terminals *b* of elements 8 are subjected to a +50 volt bias only for a predetermined portion of the operating cycle.

Waveforms A, B, E, G, I and J, shown in Figs. 11–14, are applied to the various terminals of the system as indicated by the following table:

| Waveform | Terminal | Element | Figure |
|---|---|---|---|
| A | c | 5 | 3 |
| A | b | 1 | 2 |
| B | d | 2 | 2 |
| B | b | 3 | 5 |
| E | c | 6 | 9 |
| G | d | 5 | 3 |
| I | b | 8 | 3 |
| J | c | 7 | 10 |

These waveforms may be supplied by any device adapted to furnish waveforms of the type shown in Figs. 11–14. In many instances suitable waveforms are available in the general control circuits of the computer in which the electronic storage device of the present invention is used. Some of the waveforms, as for example those illustrated by curves A, G, I and J, serve to bias the various storage elements at clearly defined instants of each operating cycle, according to whether the desired operation is recording, zero resetting, or regeneration.

As has been previously stated, let it be assumed that the value 6, represented by curve E, is applied to the storage position in Fig. 1 corresponding to contact 12*a*. It will be apparent that the explanation which follows would apply equally well to the recording of a value in any of the other positions. Let it be assumed that capacitor 19 of storage element 6, shown in detail in Fig. 9, is fully discharged at the beginning of the operating cycle in which recording, or storing, is to take place. As a result of these conditions, terminal *a* of element 6 (Fig. 9) is brought to the value $V_m$ which, in the disclosed embodiment is equal to +300 volts. The potential changes of this terminal are shown by curve F, Fig. 11. Tube T6 preferably comprises a double triode, although it will be understood that a pair of separate tubes would be equally suitable. The voltage values applied to the various terminals are shown in Fig. 9.

Figure 2:
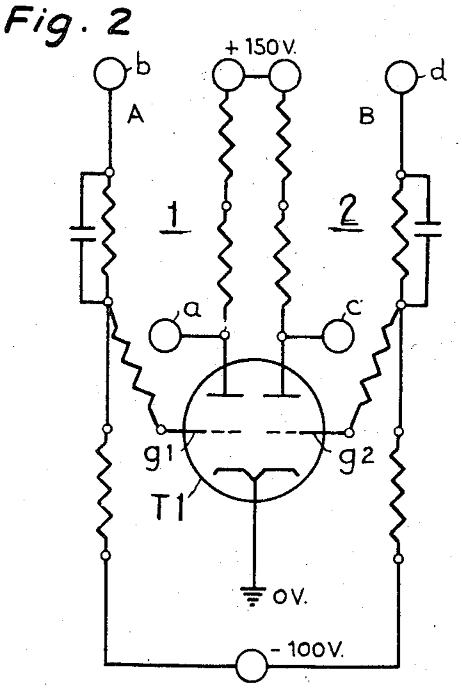

For every recording cycle, a pulse, waveform B (Fig. 11), is applied, during the time interval between points 18 and 0, at terminal *d* of element 2 (Fig. 2). Element 2 includes the right-hand portion of double triode T1, and the voltages applied to the various terminals thereof are shown in Figure 2. The pulse of waveform B renders the right-hand portion of tube T1 conductive. Waveform A is applied to terminal *b* of element 1 (Fig. 2), so that each pulse thereof renders the left-hand portion of tube T1 conductive. Output terminal *a* of element 1 is connected to output terminal *c* of element 2, as shown in Fig. 1, and these joined terminals are connected by means of line D to terminal *b* of element 6 (Fig. 9). The voltage values indicated in the figure and applied to the terminals of element 6 have been calculated so that grid *g2* of tube T6 cuts off its corresponding triode when either half of tube T1 is conductive. The value of the potential applied to grid *g2* of tube T6 is insufficient for the complete control of this tube, however, the potential of the electrode of capacitor 19, which is connected to terminal *a* remains constant only until point 6 is reached, as shown by waveform F in Fig. 11.

Figure 11:
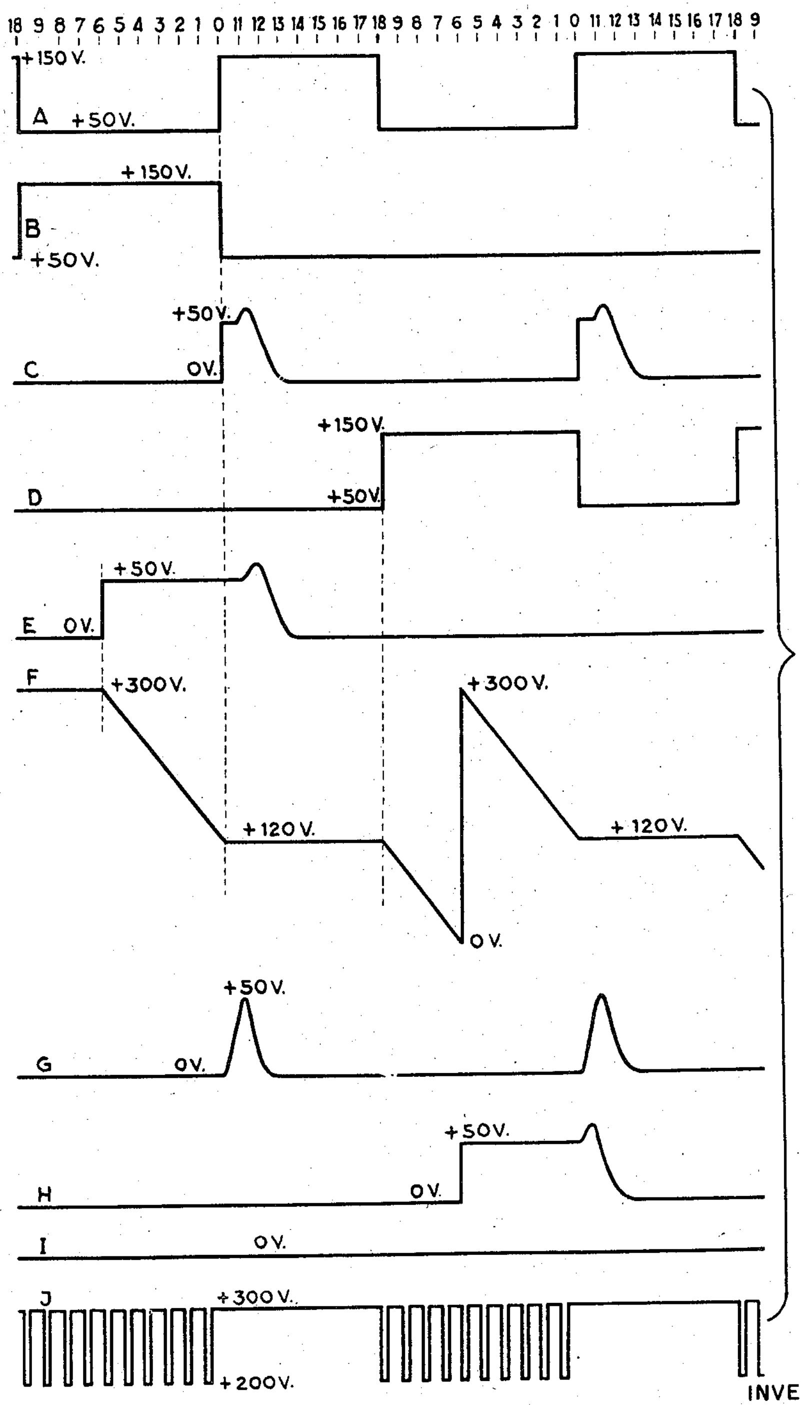

The pulse of waveform E, corresponding to the value to be recorded, is applied to terminal *c*. This terminal is connected to grid *g1* of tube T6 through resistors 20 and 21, preferably each of 47,000 ohms, and capacitor 22, preferably having a value of 100 micromicrofarads. The resultant change in the potential of terminal *c* from 0 to +50 volts, occurs at point 6 time, as shown in Fig. 11, and renders the left-hand portion of tube T6 conductive, so that the charging of capacitor 19 begins. The charge is built up through the following circuit: terminal *e*, maintained at a constant potential of −100 volts; resistor 23, preferably having a value of 62,000 ohms; the left-hand portion of tube T6; capacitor 19; and terminal *f* maintained at potential $V_m$ of +300 volts. The electrode of capacitor 19 which is connected to terminal *a* therefore undergoes the voltage change shown by waveform F (Fig. 11). The ohmic resistance of resistor 23 is such that the capacitor 19 undergoes a voltage change of 30 volts for every point. The potential of terminal *a* reaches a value equal to 120 volts at point 0.

Figure 3:
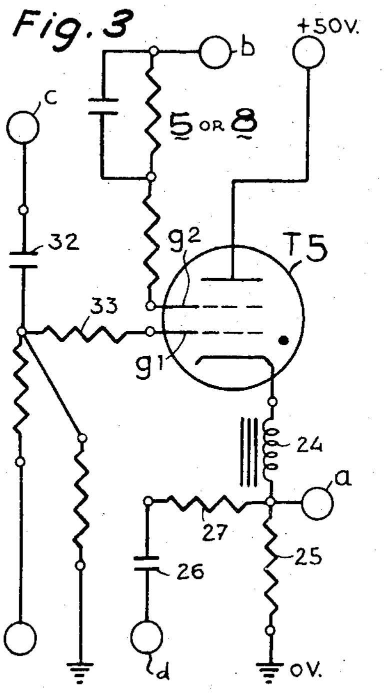

In the example, the storage unit has been cut off between points 0 and 18, so that various operations can be performed during this time interval. During this part of the cycle, the charging of capacitor 19 is stopped by means of the pulse supplied by element 5 (Fig. 3) to element 6 (Fig. 9). At point 0, the potential of line A increases again from +50 volts up to +150 volts, as shown by waveform A in Fig. 11, so that grid *g1* of tube T1 (Fig. 2) undergoes a potential increase which makes the left-hand triode conductive. As a result, a negative pulse is collected on terminal *a* of element 1 and is transmitted to terminal *b* of element 6, thus completing the cutoff of the right-hand portion of tube T6 during the time interval between points 0 and 18. In every operating cycle, a pulse (waveform A) is applied to terminal *c* of element 5 (Fig. 3). When the voltage of waveform A returns, at point 0, from +50 volts to its initial value of +150 volts, a positive pulse is transmitted to grid *g1* of thyratron T5 which renders thyratron T5 conductive. Terminal *a* connected to the junction point of inductor 24, preferably having a value of 3.5 millihenries, and resistor 25, undergoes a suddent voltage variation, thus bringing the potential of terminal *d*, connected to the cathode of tube T6 (Fig. 9), to a potential high enough to complete the cutoff of this tube, due to the connection C (Fig. 1). Tube T5 (Fig. 3) is cut off subsequently, so that it will be ready for use in the next cycle. For this purpose, a positive pulse shown by waveform G, Fig. 11, is utilized. This pulse is applied to terminal *d*, connected to the cathode of tube T5 through capacitor 26, preferably having a value of 25,000 micromicrofarads, and resistor 27, preferably having a value of 1200 ohms. This pulse of waveform G brings the potential of the cathode of thyratron T5 to a value sufficient to cause thyratron T5 to cut off.

When the last point of the cycle is reached, that is, point 18, the voltage of line A, Fig. 1 (waveform A) again passes from +150 volts to +50 volts. The voltage drop transmitted to grid *g*1 of tube T1 through terminal *b* cuts off the left-hand portion of this tube which, at point 0, was conductive. No pulse being applied to grid *g*2 of tube T1, the potential of terminal *c* increases up to a value of +150 volts. The potential of terminal *b* of element 6 (Fig. 9) follows the variation of voltage applied to line D, Fig. 1 (waveform D), so that the potential of grid *g*2 of tube T6 is brought to a value sufficient to render the corresponding triode conductive. In this case, capacitor 19 again is charged, until the voltage of its electrode connected to terminal *a* reaches the value 0. The slope of the charge having been designed so that the voltage drop is 30 volts for every point. Thus the value 0 is reached at point 6.

Line F, Fig. 1 (waveform F), connecting terminal *a* of element 6 to terminal *b* of element 7 (Fig. 10), transmits to the cathode of thyratron T7 a sufficiently negative value to cause the conduction of this tube as soon as a sufficient pulse is applied to its grid *g*1. A series of synchronization pulses supplied by the multivibrator of Fig. 4 serves, in accordance with the present invention, to start conduction of this thyratron at determined points of the cycle. For this purpose, line J, Fig. 1, the potential variations of which are indicated by waveform J of Fig. 11, is connected to grid *g*1 of thyratron T7 (Fig. 10) through terminal *c*; a resistor 29, preferably of 120,000 ohms; and a capacitor 30, preferably of 330 micromicrofarads, connected to resistor 31, preferably of 47,000 ohms. A sudden discharge of capacitor 19 therefore occurs at a very precise point, this point being point 6 in the chosen example. The potential of terminal *a*, Fig. 9, therefore returns to its initial value $V_m$=300 volts at the point corresponding to the value of the recorded digit. The value of resistor 28 (Fig. 10) is preferably 600 ohms. The tube T7 (Fig. 10) immediately becomes nonconductive at the moment of the discharge of capacitor 19, since a voltage difference no longer exists between its cathode and anode. Since the voltage of line A, Fig. 1 (waveform A), has not changed during this time interval the voltage of line D holds the value of +150 volts as shown by waveform D, Fig. 11. Thus the right-hand portion of tube T6 is conductive, providing a path through which capacitor 19 is again recharged beginning at the same point 6 of the cycle during which the pulse corresponding to the value 6 had been applied initially to the storage unit.

Figure 12:
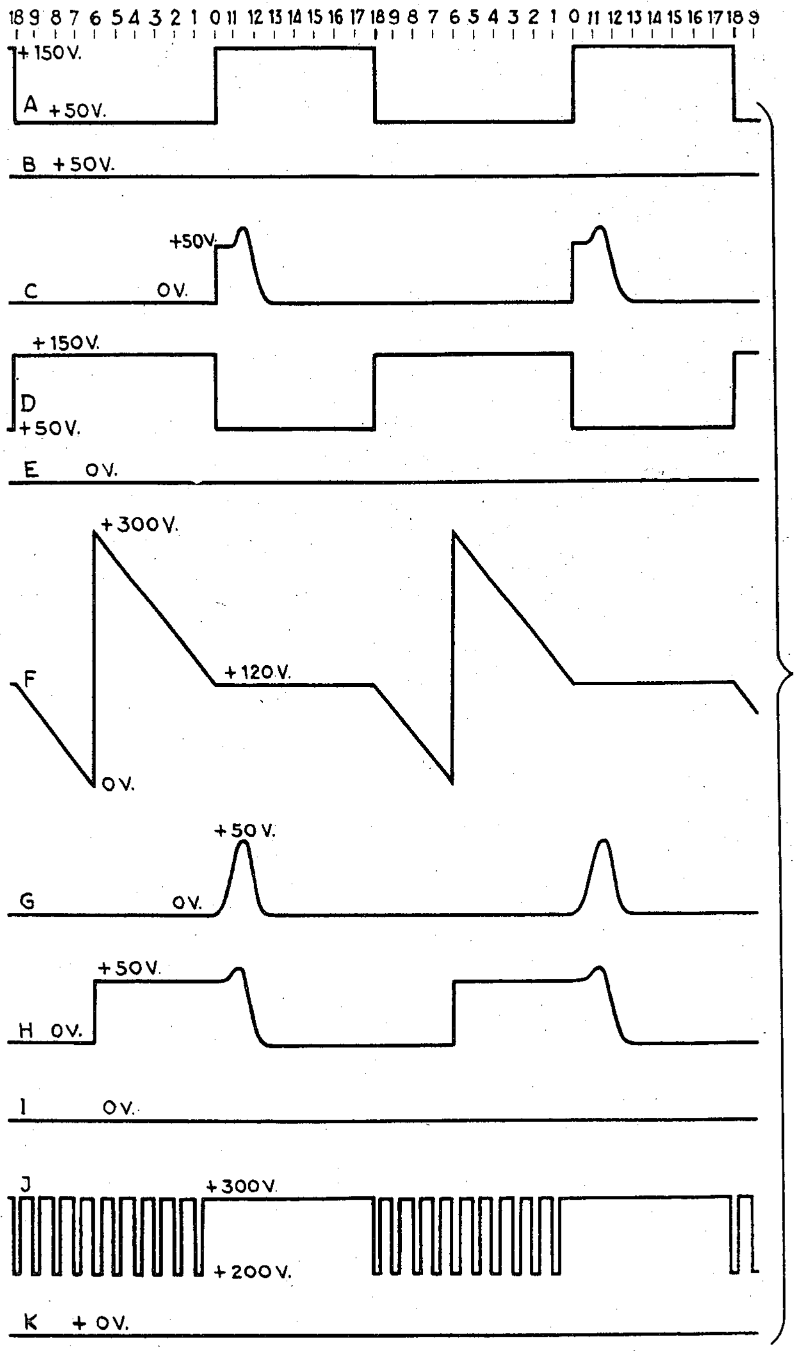

Referring now to Fig. 12, it will be noted that, during the regeneration of the value stored, the voltage variations are identical with those corresponding to the second operating cycle illustrated in Fig. 11. The pulse (Fig. 11) of waveform B having ceased at point 0 of the first operating cycle, the voltage applied to terminal *b* of element 6 (Fig. 9) again causes capacitor 19 to charge at point 18 of each cycle; that is, when the electrode of capacitor 19 which is connected to terminal *a* of element 6 is at +120 volts.

As has previously been explained the charge of the capacitor 19 is completed at point 6 when the voltage on terminal *a* of element 6 has reached the potential $V_0$=0. The thyratron T7 (Fig. 10) then causes the discharge of capacitor 19 at a precise instant of the cycle determined by the synchronization pulses of waveform J. At the moment of the discharge, the voltage increase of grid *g*1 of tube 17, causing its ionization, is transmitted from terminal *a* of element 7 to terminal *c* of element 8 (Fig. 3), which is identical to the previously described element 5 (Fig. 3). The voltage increase transmitted to grid *g*1 of T5 through capacitor 32, preferably having a value of 330 micromicrofarads, and resistor 33, preferably of 150,000 ohms, causes the thyratron T5 of element 8 to ionize. Accordingly, a positive pulse shown in Figs. 11 and 12 by waveform H, appears at terminal *a* of element 8. This pulse is directed through relay contact 15*a* to output terminal 17 (Fig. 1). Line G, Fig. 1 (waveform G), supplies to terminal *d* of element 8 a positive pulse at point 0 of every cycle, thus causing the thyratron of this element to become nonconductive at this point. The ionization of this thyratron having been initiated at point 6, it will be evident that the pulse of waveform H available in each cycle at terminal 17 has a duration proportional to the value of the recorded digit.

Figure 13:
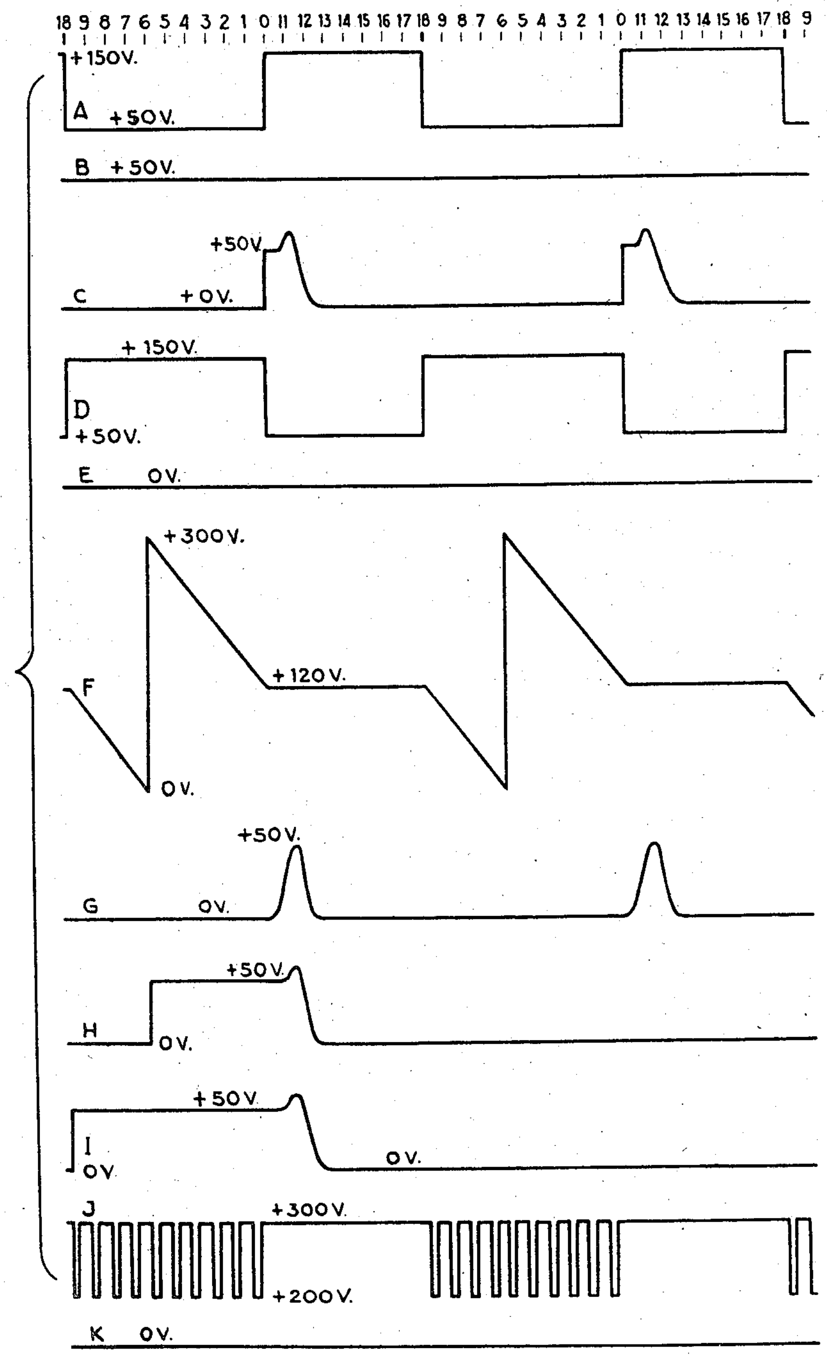

If it is desired to collect on terminal 16 only a single pulse of waveworm H occurring in a predetermined cycle, relay 15 (Fig. 1) is energized so that contact 15*d* transfers, and terminal *b* of element 8 is no longer connected with line 18, Fig. 1 (maintained at a fixed potential of +50 volts) but is connected with line I, Fig. 1, the voltage variation of which is indicated by waveform I in Fig. 13. Under these conditions, although regeneration is always performed in an identical manner, only a single pulse of waveform H is collected at terminal 16, corresponding to the portion of the cycle during which the potential of line I is up from 0 to +50 volts. As soon as the potential of line I returns to 0 volts, Fig. 13, the voltage of grid *g*2 of T5, Fig. 3, connected to terminal *b* of element 8 (Fig. 3), is insufficient to permit the ionization of the tube under the effect only of the voltage increase applied to grid *g*1 when thyratron T7 (Fig. 10) is made conductive.

Figure 5:
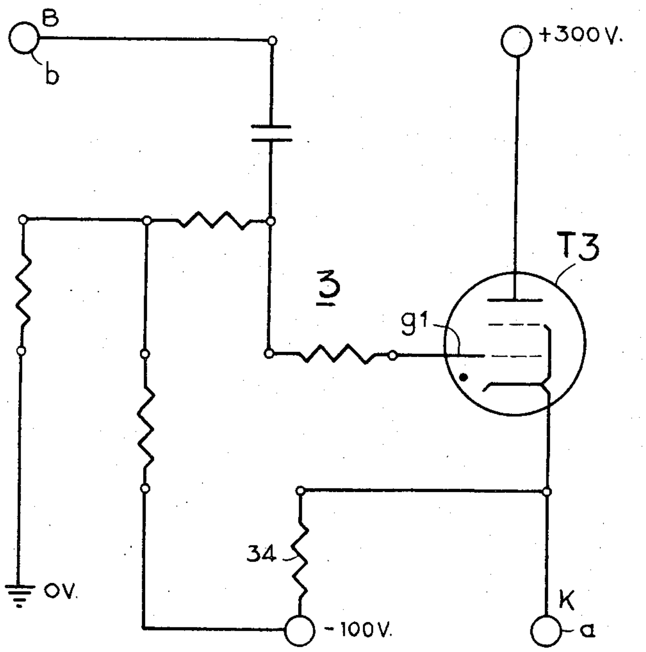
Figs. 5 and 6 are circuit diagrams of the arrangement for providing zero resetting of the storage unit of Fig. 1.
Figure 6:
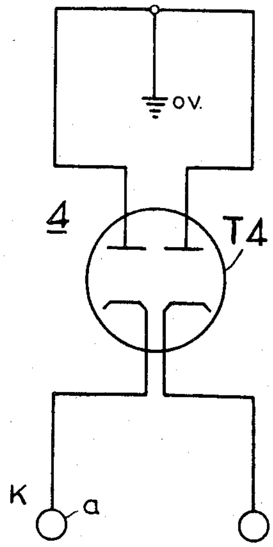
Figure 14:
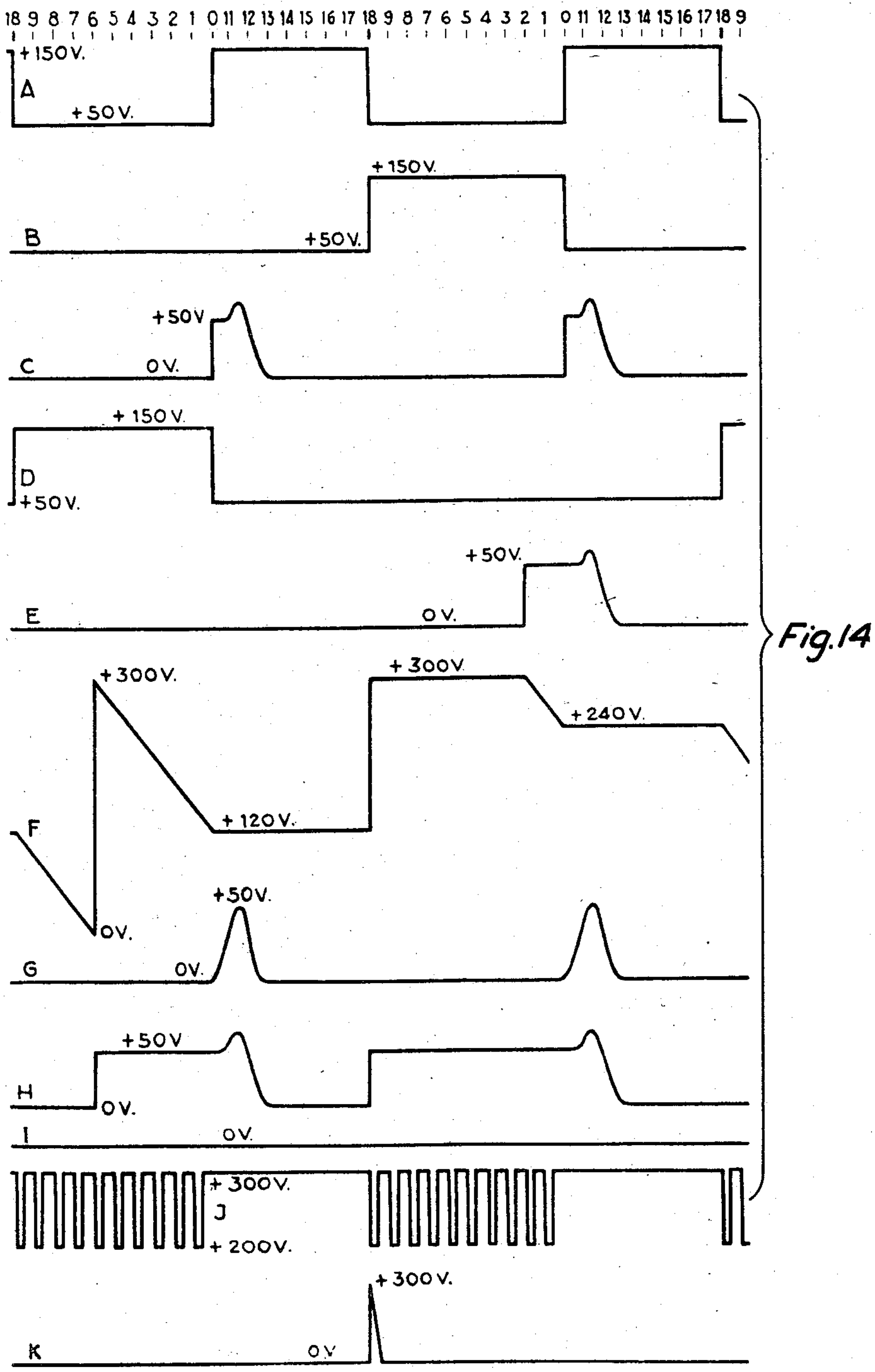

If it is desired to record a new value, as for example the value 2, it is first necessary to perform a zero resetting of the storage unit which has just been described. For this purpose, every time a new recording cycle is started by the rise of pulse B, as previously described, the pulse of waveform K as shown in Fig. 14 is also produced. This pulse, applied at the beginning of each new recording cycle, causes the discharge of the capacitor 19. The potential of terminal *a* (Fig. 9) again increases up to the value $V_m$=300 volts, so that similar operations, as represented in Fig. 11, occur again. The pulse of waveform K occurs at the moment of the application of the pulse of waveform B to terminal *b* of element 3, Fig. 5. The voltage increase of grid *g*1 of thyratron T3, Fig. 5, causes its ionization at point 18. Due to the presence of resistor 34, preferably of 40,000 ohms, the thyratron T3, Fig. 5, cannot remain conductive, and thus a positive pulse is collected at terminal *a* connected to its cathode. As shown in Fig. 1, terminal *a* of element 3 is connected to terminal *d* of element 7. Accordingly, the positive pulse at this terminal brings grid *g*1 of thyratron T7 (Fig. 10) to a value sufficient to cause its ionization. This pulse is applied to grid *g*1 through resistor 35, preferably of 12,000 ohms, and resistor 31. As soon as thyratron T7 is made conductive, capacitor 19 (Fig. 9), associated with it as previously described, is discharged, so that similar operations occur again as were outlined above in connection with the recording of the value 6. It will be apparent that the pulse of waveform E (Fig. 14) initiates the charging of capacitor 19 at point 2, so that its electrode which is connected to terminal *a* (Fig. 9) is brought down to +240 volts at point 0 instead of +120 volts as in the preceding case. It will be noted from Fig. 1, that terminal *d* of element 7 (Fig. 10) is connected to terminal *a* of element 4 (Fig. 6). This element comprising a double diode T4 is intended for use with two distinct groups of storage units. This arrangement is provided in order to prevent the potential of grid *g*1 of tube T7, which is connected to a source of −100 volts (Fig. 5) through terminals *d* (Fig. 10) and *a* (Fig. 5) and resistor 34 of element 3, from dropping to a negative value.

It will be noted, as shown in Fig. 9, that grids *g*1 and *g*2 of tube T6, comprising the storage unit, are connected respectively through resistors, preferably each of 47,000 ohms, to diodes 36 and 37, the cathodes of which are connected to ground. These diodes, which of course could be replaced by rectifiers of any other suitable type, prevent the potential of grids of $g1$ and $g2$ from increasing above 0 volts under the influence of voltage variations of waveforms E or D, which are respectively applied to terminals *c* or *b* of element 6 (Fig. 9). On the other hand, these diodes (36 and 37, Fig. 9) will not limit potential excursions of grids $g1$ and $g2$ in the negative direction. Another diode 38 is connected between the cathode of tube T6 (Fig. 9) and terminal *d* of element 6. The cathode of the diode 38 being connected to the cathode of the tube T6 and the anode of diode 38 being connected through terminal *d* and line C to termi-*a* of element 5, as shown in Fig. 1. Accordingly, the pulses represented by waveform C as developed at terminal *a* of element 5 are applied to terminal *d* of element 6. When the voltage on terminal *d* of element 6 is equal to 0 and tube T6 is made nonconductive by the application of a suitable negative voltage to its grids $g1$ and $g2$, diode 38 keeps the potential of the cathode of tube T6 from dropping in a negative direction below 0 volts. When the voltage of terminal *d* of element 6 is equal to +50 volts, this full voltage appears on the cathode of T6 and serves, under the conditions previously described, to stop conduction through this tube.

It has just been pointed out that the potential of line C, Fig. 1, connecting terminal *a* of element 5 to terminal *d* of element 6 could vary between 0 and +50 volts, depending upon the condition of conduction of tube T5. In order to prevent the potential of line C, Fig. 1 (waveform C), from dropping to a negative value when thyratron T5 is not conductive, due to current flow through the circuit comprising ground, resistor 25, terminal *a* of element 5, line C, terminal *d* of element 6, diode 38, resistor 23, terminal *e* of element 6 and the —100-volt power supply, a diode or rectifier 39 (Fig. 1) of any suitable type is connected between ground and line C. The cathode of the diode 39 (Fig. 1) is connected to line C and the anode to ground.

Figure 7:
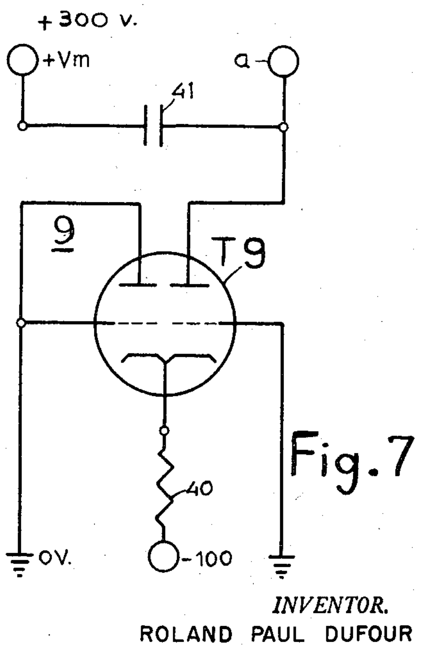
Figs. 7 and 8 are circuit diagrams of the arrangement for synchronizing the multivibrator of Fig. 4.
Figure 8:
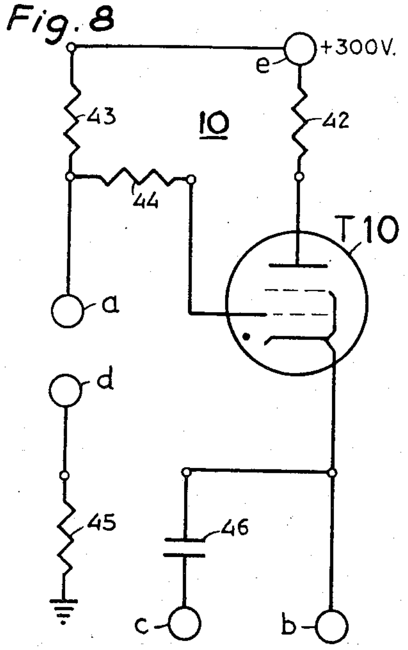

In accordance with an important feature of the present invention, means is provided for stabilizing the multivibrator pulses which are utilized in the system, in order to minimize the effect of variations in the values of $V_m$ and $V_0$. This arrangement is intended to make the frequency of the pulses yielded by the multivibrator substantially independent of voltages $V_m$ and $V_0$, and comprises elements 9 and 10 including tubes T9 and T10 and their associated components (Figs. 7 and 8). The multivibrator to be controlled comprises element 11, shown in Fig. 4.

Figure 4:
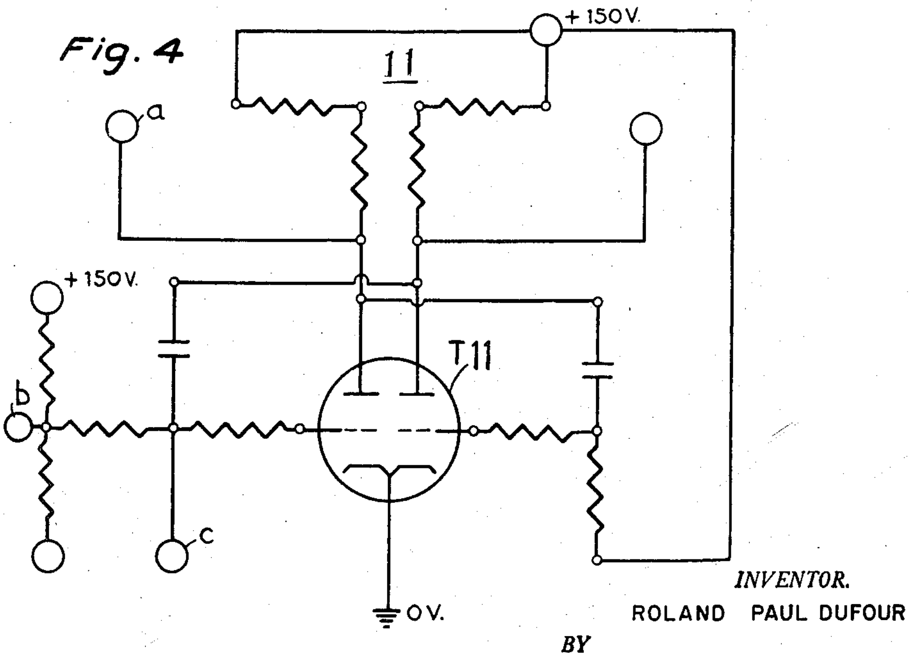
Fig. 4 is the circuit diagram of a multivibrator used for the general control of synchronization and of recording in the system of Fig. 1.

Element 9 (Fig. 7) comprises a double triode tube T9, a resistor 40, preferably of 62,000 ohms, and a capacitor 41, preferably of 4700 micromicrofarads. It will be apparent that other types and values of components for providing the function may be substituted if desired. Element 9 may be referred to as the recharge element. Element 10 (Fig. 8) comprises a thyratron T10, the anode of which is connected to the high voltage supply $V_m$ through a resistor 42, preferably of 600 ohms, and the grid of which is brought to a potential 0.1 $(V_m—V_0)$ by means of a voltage divider. This voltage divider, which is connected between terminal *e* and ground, comprises a resistor 43, preferably of 12,000 ohms; terminal *a*; external potentiometer 47 (Fig. 1), preferably of 50,000 ohms; terminal *d*; and resistor 45, preferably of 82,000 ohms. Element 9 is connected through its terminal *a* to terminal *b* of element 10 corresponding to the cathode of tube T10 (see Fig. 1). The operation is quite similar to that of a storage unit comprising elements 6 and 7. There is collected on terminal *c* of element 10, through a capacitor 46, preferably of 50 micromicrofarads, a pulse train adapted to synchronize multivibrator element 11. This pulse train is applied to terminal *a* of multivibrator element 11 (Fig. 4). Element 11 comprises a double triode T11 and the associated components illustrated in Fig. 4. Terminals *b* and *c* are externally connected to a potentiometer 48 (Fig. 1), preferably of 500,000 ohms. This potentiometer provides a frequency adjustment. Due to the provision of these elements, the frequency of the pulses provided on line J (waveform J) by the multivibrator of Fig. 4 is modified by changes in the values of $V_m$ and $V_0$, in such a manner that the number of pulses transmitted during the charge of the capacitor 19 is maintained substantially constant.

It is to be appreciated that elements 8 (Figs. 1 and 3) serve as an arrangement for providing low-impedance pulses adapted, for example, for the control of electromagnetic relays. If desired, the thyratrons comprising these elements could be replaced by suitable trigger circuits, which, depending upon the initial moment when these tubes are controlled, are adapted to yield a pulse corresponding either to the direct reading of the recorded value or to the reading of its nines complement, or tens complement.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device for electrical pulses comprising: a capacitor, means for changing the state of charge of said capacitor in a plurality of steps in one direction between first and second values in a time interval corresponding to one operating cycle of said device, means for initiating the change in charge of said capacitor in said one direction at a predetermined point in a given operating cycle, and means for reversing the direction of charge when said second value is reached and immediately restoring the state of charge to said first value in a single step.

2. A storage device for electrical pulses comprising: a capacitor, means for charging said capacitor in a plurality of steps between first and second values in a time interval corresponding to one operating cycle of said device, means for initiating the charging of said capacitor at a predetermined point in a given operating cycle, and means for discharging said capacitor when said second value is reached and immediately restoring the state of charge to said first value in a single step.

3. A storage device for electrical pulses comprising: a capacitor adapted to have its state of charge changed in one direction between first and second values in a time interval corresponding to one operating cycle of said device, means for changing said state of charge in said one direction between said first value and an intermediate value in a time interval beginning at a predetermined point in the first portion of a first operating cycle and ending at the end of said first portion, means for maintaining said state of charge substantially at said intermediate value for the remaining portion of said first operating cycle, means for changing said state of charge in said one direction between said intermediate value and said second value in a time interval ending at a point in the second operating cycle corresponding to said predetermined point in said first operating cycle, and means for reversing the direction of charge when said second value is reached and immediately restoring the state of charge to said first value.

4. A storage device for electrical pulses comprising: a capacitor adapted to be charged between first and second values in a time interval corresponding to one operating cycle of said device, means for charging said capacitor between said first value and an intermediate value in a time interval beginning at a predetermined point in the first portion of a first operating cycle and ending at the end of said first portion, means for maintaining the state of charge of said capacitor substantially at said intermediate value for the remaining portion of said first operating cycle, means for charging said capacitor between said intermediate value and said second value in a time interval ending at a point in the second operating cycle corresponding to said predetermined point in said first operating cycle, and means for discharging said capacitor when said second value is reached and immediately restoring the state of charge to said first value.

5. A storage device for electrical pulses comprising: a capacitor adapted to have its state of charge changed in one direction between first and second values in a time interval corresponding to one operating cycle of said device, means for changing said state of charge in said one direction between said first value and an intermediate value in a time interval beginning at a predetermined point in the first portion of a first operating cycle and ending at the end of said first portion, means for maintaining said state of charge substantially at said intermediate value for the remaining portion of said first operating cycle, means for changing said state of charge in said one direction between said intermediate value and said second value in a time interval ending at a point in the second operating cycle corresponding to said predetermined point in said first operating cycle, means for reversing the direction of charge when said second value is reached and immediately restoring the state of charge to said first value, and means comprising a gaseous discharge device for providing an output pulse corresponding to each said reversal.

6. A storage device for electrical pulses comprising: a capacitor adapted to have its state of charge changed in one direction between first and second values in a time interval corresponding to one operating cycle of said device; means for changing said state of charge in said one direction between said first value and an intermediate value in a time interval beginning at a predetermined point in the first portion of a first operating cycle and ending at the end of said first portion; means for maintaining said state of charge substantially at said intermediate value for the remaining portion of said first operating cycle; means for changing said state of charge in said one direction between said intermediate value and said second value in a time interval ending at a point in the second operating cycle corresponding to said predetermined point in said first operating cycle; means for developing a predetermined number of uniformly spaced pulses in each operating cycle of said device; and means for reversing the direction of charge when said second value is reached and immediately restoring the state of charge to said first value, said last-mentioned means utilizing said uniformly spaced pulses to time said reversal.

7. A storage device for electrical pulses comprising: a capacitor adapted to have its state of charge changed in one direction between first and second values in a time interval corresponding to one operating cycle of said device; means for changing said state of charge in said one direction between said first value and an intermediate value in a time interval beginning at a predetermined point in the first portion of a first operating cycle and ending at the end of said first portion; means for maintaining said state of charge substantially at said intermediate value for the remaining portion of said first operating cycle; means for changing said state of charge in said one direction between said intermediate value and said second value in a time interval ending at a point in the second operating cycle corresponding to said predetermined point in said first operating cycle; means dependent upon said first and second values for developing a fixed number of uniformly spaced pulses in each operating cycle of said device; and means for reversing the direction of charge when said second value is reached and immediately restoring the state of charge to said first value, said last-mentioned means utilizing said uniformly spaced pulses to time said reversal.

References Cited in the file of this patent

UNITED STATES PATENTS

| | | |
|---|---|---|
| 2,208,655 | Wright | July 23, 1940 |
| 2,268,859 | Dohle | Jan. 6, 1942 |
| 2,629,827 | Eckert | Feb. 24, 1953 |

OTHER REFERENCES

"The Snapping Dipoles of Ferroelectrics as a Memory Element for Digital Computers" by Pulvari in the proceedings of the Western Computer Conference, June 1953 (pages 145–150 and 155–158 relied upon).